Patented May 7, 1940

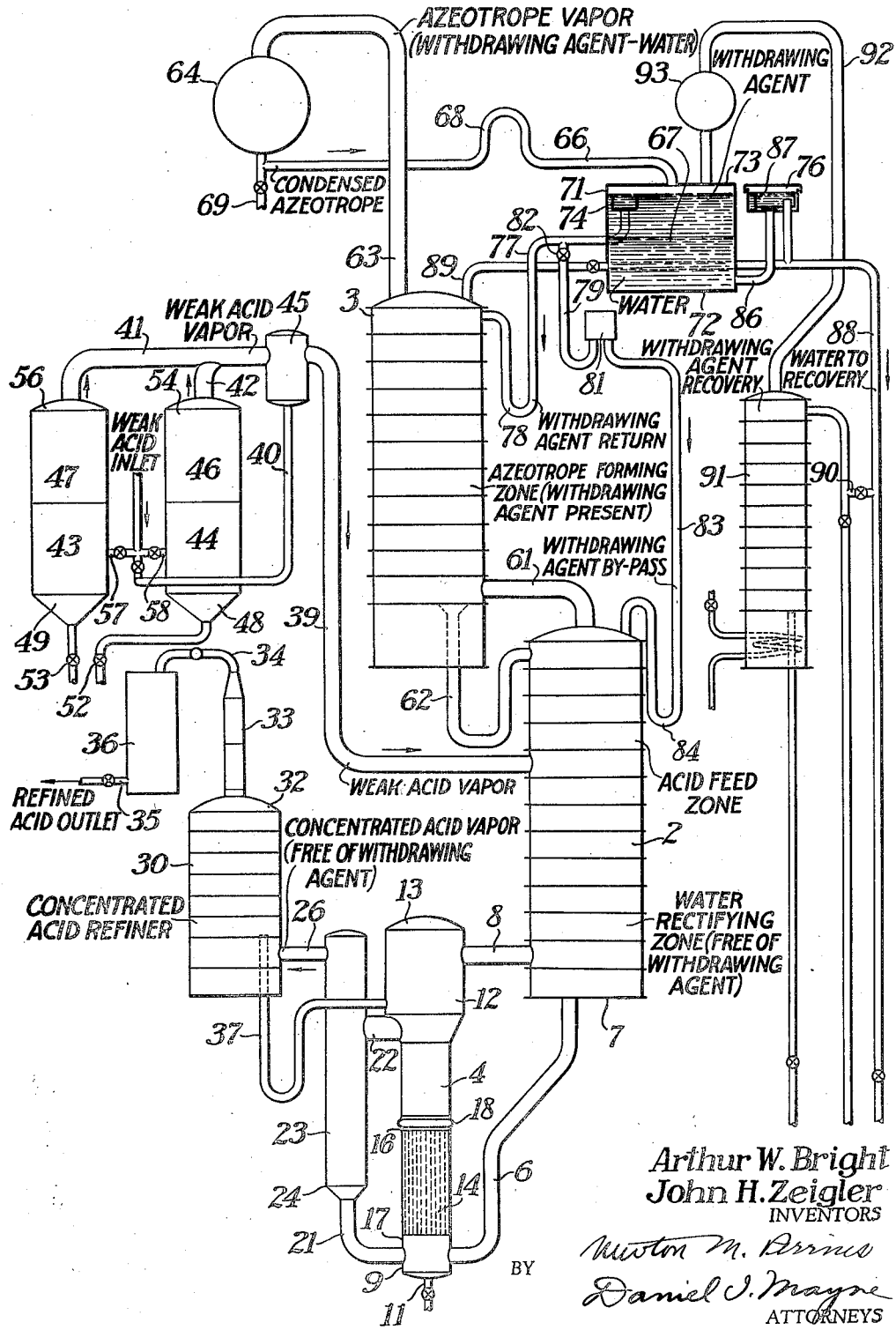

2,199,982

UNITED STATES PATENT OFFICE 2,199,982

PROCESS FOR STARTING AND BALANCING AZEOTROPIC DISTILLATION SYSTEMS

Arthur W. Bright and John H. Zeigler, Kingsport, Tenn., assignors, by mesne assignments, to Eastman Kodak Company, Rochester, N. Y., a corporation of New Jersey Application July 25, 1936, Serial No. 92,635

5 Claims. (Cl. 202—42)

This invention relates to processes of removing water from aqueous solutions containing aliphatic acids by azeotropic distillation and more particularly to procedure for starting and balancing azeotropic distillation systems.

As pointed out in Gordon application No. 744,250, now Patent No. 2,049,440; Gordon application No. 26,226, now Patent No. 2,049,441; or Othmer application No. 734,991, now Patent No. 2,050,234; and Othmer Patent No. 2,028,800, there are large quantities of dilute aliphatic acid available in the industry. It is generally necessary that at least a part of the water be removed from these dilute aliphatic acid solutions before the acid content may be utilized. A number of processes which may be termed "azeotropic distillation" have been developed together with apparatus for dehydrating dilute solutions of the aliphatic acids.

In constructing new apparatus to be used for azeotropic distillation with some specific entrainer, the entrainer characteristics are taken into consideration in the apparatus design. That is, knowing that the entrainer will carry over a certain amount of water, the apparatus would probably be constructed with certain size conduits and other parts to take care of these known quantities of material. However, conditions arise where it may be desired to change from using one entrainer in a column to a different entrainer. Also, it may be desirable to operate an old distillation column with some new entrainer, such as the ester-alcohol entrainer of Gordon application No. 744,250, now Patent No. 2,049,440. Sometimes standard distillation columns are employed without reference to any particular construction to specifically adapt them for azeotropic distillation.

It is, therefore, apparent that there is a substantial problem in starting and carrying out azeotropic distillation with any entrainer in any type distillation column suitable for azeotropic distillation.

This invention has as an object to provide a process for removing water from dilute solutions of acetic, propionic or other aliphatic acid or mixtures thereof by distillation in any column suitable for azeotropic distillation with any entrainer suitable for forming an azeotrope with water. A further object is to provide a process for starting and balancing columns employed in the dehydration of aliphatic acids by azeotropic distillation. A still further object is to provide a process for starting and balancing old columns with new or different entrainers for azeotropic distillation. Another object is to provide a process for starting and balancing either old or newly constructed distillation columns with new entrainers for azeotropic distillation. A still further object is to provide a process for azeotropic distillation of the aliphatic acids in which the water removed carries with it to waste only a very small amount of acid. A further object is to provide a process for the dehydration of aqueous solutions of the lower aliphatic acids by azeotropic distillation, in which the acid produced is substantially or entirely free of entraining agent. It is also an object to provide a procedure for starting and balancing a continuous process for the azeotropic distillation of aqueous solutions of the aliphatic acids. Another object is to provide a process for starting and balancing an azeotropic distillation system for use in producing either a wet aliphatic acid or a dry aliphatic acid. Other objects will appear hereinafter.

We have found that any distillation column suitable for azeotropic distillation may be started and brought to an efficient state of operation by charging in sufficient entrainer into the column to prevent loss of acid from the column during distillation and then thereafter making further entrainer additions to cut down on the acid loss until the desired operating conditions are obtained.

Our invention may be operated with any of the various entrainers known to be useful for the dehydration of aliphatic acids but our invention is particularly adaptable to the use of the new ester-alcohol entraining agents, fully described in Gordon application No. 744,250, now Patent No. 2,049,440. These agents, or other agents known to be useful in the azeotropic distillation of aliphatic acids may be employed by our procedure in either old or new columns. Our invention is also particularly adaptable to the starting and balancing of distillation systems wherein high boiling point entraining agents, which it is desired to keep out of the concentrated acid, are to be used.

Our invention, relating to the starting and balancing of columns employed in azeotropic distillation, may be employed in any apparatus suitable for the azeotropic distillation of aliphatic acids, such as for example the apparatus shown in U. S. Patent No. 2,028,800, Gordon application No. 744,250, now Patent No. 2,049,440 and Gordon application No. 26,226, now Patent No. 2,049,441.

For a more complete understanding of our invention, further description will be directed to our invention as carried out in the apparatus shown in the attached drawings, which is also shown and described in Gordon application No. 26,226, now Patent No. 2,049,441.

Fig. 1 represents a diagrammatic side elevation of the preferred embodiment of a plant layout of a new distillation unit and associated apparatus for practicing our new process, certain parts being shown in section or broken away and other parts on an enlarged scale for clarity.

In Fig. 1, 2 represents the lower or primarily water distilling column of the unit. This column contains a plurality of bubble plate sections, usually between about 20 and 35 dependent on the capacity required and the efficiency of rectification desired.

Above, and in offset relationship to column 2, is another column designated 3, of construction similar to column 2. This column, when operating in accordance with one aspect of the process, can be considered primarily as an azeotrope fractionating column.

Most of the heat required for distillation is supplied to the system by means of the calandria section 4 connected to column 2 at the column bottom 7 by conduit 6 and to the column side by conduit 8. The acid in the liquid state flows down conduit 6 into the calandria base 9.

The calandria comprises the vertically extending cylinder 4 provided with the base 9 having the valved outlet 11, for withdrawing solid residue or other materials from the calandria. The upper portion of the calandria comprises the enlarged portion 12, provided with the cap 13 and connected to column 2 by conduit 8.

The interior of the calandria may be constructed in any suitable manner, whereby the said liquid may be heated and vaporized. For example, a plurality of, or nests of, tubes 14 arranged in any suitable boiler tube construction, such as between tube sheets 16 and 17 may be employed. The acid passes through the tubes which are surrounded by an appropriate heating medium. Usually several such sections are required and expansion means 18 may be placed between such sections.

Some of the acid liquid entering the base of the calandria is heated by passing through the several heating sections, finally vaporizing and expanding in the enlarged portion 12, whereupon it passes into column 2 through conduit 8. By virtue of heating the acid stream in this manner, a pinch effect is exerted on the liquid and a well-defined circulation down the pipe 6, up through the calandria and into the column 2 is established.

Part of the acid liquid and/or vapors, instead of circulating as just described, pass through conduits 21 and 22 into an adjacent parallel unit comprising the vertically extending cylindrical shell 23. The interior of the shell may be provided with heating means, such for example as described with respect to calandria 4. This shell is connected at its bottom 24 with conduit 21 and at the upper part above conduit 22 with another pipe 26, which leads into the side of a small refining column designated 30.

This refining column 30 is of bubble plate construction similar to the construction of columns 2 and 3, but on a smaller scale. The head 32 of this refining column is provided with the dephlegmator 33 which is connected by means of the valved pipe 34 with the condenser 36. In that the purified concentrated acid passes through this device, it is important that the condenser be constructed of exceptionally high grade materials, such as of the noble metals, high grade Cr—Ni steel or the like, or ceramics or glass. This condenser may be equipped with valved draw-off conduits and the like 35 for removing the condensate therefrom.

A U-shaped conduit 37, which is in the nature of an overflow conduit, extends up into the lower section of the refining column and connects it with the side of calandria 4.

As will be apparent as the description proceeds, by these connections between calandria 4, unit 23 and the refining column 30, a portion of the fully concentrated, or partially concentrated, acid (dependent on the specific process being employed) is conveniently recovered in a high state of purity in the condenser 36.

Referring now to the upper half of the water distilling column 2, there is provided a large vapor feed line 39, which branches into a plurality of vapor lines, such as 41 and 42. These branch lines lead to the head of a plurality of weak acid vaporizers 43 and 44.

These vaporizers comprise the tall cylindrical shells 46, 47 having conically-shaped bottoms 48, 49, equipped with valved outlets 52, 53. The heads 54, 56 of the vaporizers are connected with the branch lines 41, 42.

These evaporators may be heated in any well known manner, either externally or internally. We prefer to employ steam coils (not shown) within the evaporators. Supplying the weak acid to be concentrated in the vapor phase from a plurality of vaporizers, as shown, has a number of advantages in a large installation. For example, the heated acid provides a source of heat at its point of introduction into the column and within the column, thereby requiring less heat to be supplied in the calandria. This better distributes the heat throughout the distillation unit. Solid impurities are kept out of the distillation columns. Also, if one vaporizer is out of use, the equipment may still be operated.

The evaporators are equipped with inlets 57, 58, for feeding in the weak acids. The weak acid may be in the form of an aqueous solution as obtained from cellulose ester manufacture, for example containing about 20–35% acid and the balance water, or the weak acid evaporated in evaporators 46, 47 might be an extract comprising acid, water and withdrawing agent.

A further preventative of impurities getting into the distillation columns is obtained by the trap provided in the vapor feed line 39, as at 45. This trap is connected by drain line 40 to the lower portion of vaporizers 45, 47 or conduits leading thereto. As indicated in the drawing, the vapor feed enters column 2 in the upper half and preferably at a point about two-thirds of the way up the lower column. However the point of feed may vary depending on whether butyl acetate-butyl alcohol, amyl acetate-amyl alcohol or some other agent is being employed.

While we describe our invention with particular reference to the two column arrangement shown, because this represents the preferred embodiment and possesses a number of advantages, such as definition of two zones (i. e., water fractionating zone and azeotrope fractionating zone), more satisfactory construction mechanically, and other advantages, it is to be understood that the invention is not limited specifically thereto but embraces broader embodiments.

That is, our invention could be applied to a single vertical column, as for example a column comprising 30–60 plates. A suitable vertical column is shown in Patent 2,028,800. Or, instead of employing two columns, three or more might be employed. The process is operated to maintain the separate zones therein in accordance with our preferred embodiment.

Referring again to our preferred embodiment, column 2 is provided with the horizontally extending vapor outlet 61, through which the vapors fractionated in column 2 may be conducted to the next and upper column 3. The liquid flowing down column 3 is conducted by a U-shaped conduit 62 into a plate section in the lower column 2.

The upper column 3 is provided with a vapor outlet conduit 63 for conducting off the vapors fractionated in this azeotrope column. These vapors are condensed in condenser 64, after which the condensate is led through pipe 66 to the decanter 67. Pipe 66 is provided with the expansion loop 68 and the valved branch conduit 69. This branch conduit may be employed to withdraw or by-pass materials from the system.

The decanter 67 comprises a tank having the sidewalls 71, a bottom 72 and top 73, the condensate pipe 66 being connected to the top. The decanter assembly includes two over-flow basins, namely the inside overflow 74 and the outside overflow 76. The positioning of these overflows and associated parts will be governed by whether the withdrawing agent being employed is heavier or lighter than water. Assuming the apparatus set-up is to employ an ester-alcohol agent with a density less than water, so that it will form the top layer in the decanter, then the arrangement of overflow is as shown in Fig. 2. That is, the inside overflow 74 is positioned in the upper part of decanter 67. To obtain easy and proper flow the overflow may be equipped with an elliptical-shaped mouth. The overflow is connected by means of conduit 77, having the trap 78, to column 3 at about the top plate.

Branching from conduit 77 is the pipe 79, which leads to the sight glass and meter 81. A valve is provided at 82 to assist in controlling the flow of withdrawing an agent in this branched line. Another pipe 83 having a liquid trap 84 connects the sight glass meter 81 with the lower column 2, preferably at the head of this column. These conduits may or may not be used as shown in Gordon et al. application, Serial Number 26,227.

As already pointed out, various entraining agents may be used in our process, among which may be mentioned esters, ketones or ethers or combinations thereof. For the purpose of describing our invention, we refer to the ester-alcohol entrainers, such as propyl alcohol-propyl acetate, butyl acetate-butyl alcohol or iso butyl acetate-iso butyl alcohol. These agents are fully disclosed and described in Gordon application No. 26,226, now Patent No. 2,049,441. Also, our process may be applied to the production of either a wet or dry aliphatic acid.

The following example is an illustration of our preferred process, reference being made in particular to Fig. 1 for an understanding thereof. At the onset, it is to be understood that, in the following description of our process, the specific values, specific materials, specific column and the like, set forth therein, are merely for the purpose of illustration and not to be construed as limiting the invention.

If the approximate quantity of solvent and other features concerning the column are not known, then the column can be placed in operation in accordance with the following invention, varied to some extent dependent upon whether it is desired to produce a wet or a dry acid, the agent to be employed and other specific considerations.

While this procedure is to be applied in particular to columns of which no characteristics are known, it may be applied in instances to columns which have been previously operated and of which the withdrawing agent capacity is known. In accordance with one of our processes, a wet acid is produced (i. e., an acid containing several percents of water).

Assuming that propyl acetate-propyl alcohol is the agent to be employed and assuming a wet acid is desired, the following steps would be taken. The upper column 3 would be charged with the acetate-alcohol entraining agent in a predetermined amount. This could be done by partially or completely filling the decanter with entraining agent, with or without a previous addition of a shallow layer of water. This amount of entraining agent should be insufficient to balance the column when the usual run or dilute acid is to be fed at a predetermined rate.

The weak acid vaporized from the two evaporators 46 and 47, is conducted through pipe 39 into the lower column, these feed vapors being at a temperature of above 100° C. and below the boiling point of the aliphatic acid under treatment. If the weak acid supplied comprises merely an aqueous solution of acid and water, the acid and some of the water tend to go down in column 2 and some acid and a greater amount of water up the column. The vapors traveling upwardly in the column pass through conduit 61 into the upper column 3, permeating the entire system and out through out-let conduit 63 into the condenser 64 and finally through conduit 66 into the decanter. The condensate running into the decanter displaces a portion of the predetermined amount of entraining agent which has been charged into the decanter and causes it to flow out of the over-flow 74 into the return-pipe 77 and the by-pass 79. The entrainer in pipe 77 is returned to the upper column 3 and after a short interval this upper column becomes permeated with entraining agent.

In the lower column, the acid tends to go down the column and out of the base thereof, through the conduit 6 into the calandria, where some of the acid and any water are vaporized and pass back into the water fractionating column 2 again. By this means, in the lower column 2, the water and some of the acid are fractionated from the remainder of the acid. In this upper column 3 and also just before they leave column 3, these acid and water vapors contact the entrainer displaced from the decanter and ternary azeotrope compositions of water and entrainer are formed. Since the azeotrope boils materially lower than the acid and/or water, it becomes readily fractionated from the acid and/or water, passing in the vaporous condition out through the outlet conduit 63 to the condenser and decanter. The acid and/or water flow downwardly in column 3 and thence through U-shaped pipe 62 into the lower column.

In order to provide the right and desired amount of entraining agent within the column, the water layer overflowing from the decanter into the overflow basin 76 is examined and analyzed. Under the conditions that have been just described, probably a substantial content of acid will be found in this sweet water, because of the insufficient original addition of entraining agent to the system. This content of acid, which may be several percent in the sweet water, indicates that there should be more entrainer added to the system and several hundred pounds of additional entrainer are generally required to be added to the system in a commercial set-up.

On the other hand, since a wet acid is being produced, too much entrainer should not be added to the system in the upper distillation column. By observing the temperatures in various parts of the column and examining and analyzing the concentrated acid liquid flowing through the pipes 62 and 66, or at some other low point in the column bases, for a propyl acetate-alcohol content, it can be determined if too large an amount of acetate-alcohol has been added. That is, if the concentrated acid, for example in any portion of the calandria section or the vicinity thereof shows an acetate-alcohol content, this evidences that the column is flooded or has too much acetate-alcohol entrainer in the system.

When the desired conditions of low acid in the sweet water and no entrainer in the calandria section have been obtained, or even during the procedure to obtain these conditions, a portion of the ester-alcohol entrainer may be by-passed through valve circuit 79, 81, 83. This procedure is more fully described and claimed in copending application No. 26,227, now Patent No. 2,171,549 in the names of Gordon and Bright.

Therefore, the above steps are carried out periodically, the sweet water being examined for acid and the acid in the vicinity of the calandria, or at some point, preferably below the vapor feed, being examined for acetate-alcohol entrainer until the following conditions prevail. The acid content in the sweet water should be under 1% and preferably under 0.1%. The acid in the calandria section, when a wet acid is being produced, should be entirely free of any traces of acetate-alcohol entrainer and contain the desired water content. Generally when starting the process by filling the decanter with entrainer, which subsequently becomes displaced by the condensate coming over, it will be necessary to add additional entrainer to the system several times to bring about the desired conditions of a low acid content in the sweet water, care being taken that the quantity of ester-alcohol entrainer added in the entrainer system of the upper column 3 is not so great as to be found in the lower column 2 at points much below the vapor feed. As these additional entrainer additions are made, it will be noted that the temperature readings throughout column 3 and in the top of column 2 change. These temperature readings to a skilled operator will also serve as a guide to the attainment of the desired ester alcohol content of the system.

It may be stated at this point that it is also a feature of the present invention not only to produce a wet acid but to so control the process that a completely dehydrated acid which does not contain any of the entraining agent is produced. In general, this may be done in the following way.

In producing anhydrous acid in one step, the process is maintained, in general, much the same as when producing a wet acid.

This condition may be obtained by balancing the column according to the principles substantially as already set forth. If the column has been previously operated, the total amount of agent to charge to produce the desired condition may be known. Or, in any event, the column may be balanced as already described, by charging insufficient entraining agent into the upper part of the distillation unit, examining the acid content of the sweet water, and adding further amounts of agent as may be required to reduce the acid content of the sweet water.

If, instead of introducing the aqueous acid as described (i. e. acid-water), it is desired to employ extract (i. e., acid-water-agent), the extract from an extraction column or agitator system is fed into evaporators 46, 47, either alone or preferably with aqueous aliphatic acid, wherein the extract is evaporated and conducted into lower column 2.

In practicing our invention it will, of course, be kept in mind that to some extent the relative amounts of water and entrainer in the distillation unit at any one time are functions of the particular unit design and the relative sizes of those portions of the unit which contain the entrainer and water. The amount of entrainer as already set forth in detail, is governed to a large extent by the requirements of the acid content of the sweet water. As already indicated, should higher acid contents in the sweet water be permissible, then smaller amounts of entrainer may be present in the system. That is to say, in accordance with our invention, it is not absolutely necessary to know the exact azeotropic ratios of the various entrainers with water, but that the process may be carried out continuously and satisfactorily by proceeding as we have described above.

From the foregoing, it will be apparent that our invention may be carried out in other forms of apparatus of which Fig. 1 is given for the purpose of illustration and as the preferred embodiment. While in Fig. 1 two columns have been shown, it is to be understood that, for other constructions, it may be desirable to construct such a column in 3 or more sections placed one above or alongside of the other or in staggered relation. Other forms of apparatus and methods of carrying out the invention may be employed without departing from the spirit and scope thereof.

It will also be understood that the customary precautions for preventing heat losses by suitable insulation will be observed. The parts which contact with the acids are made out of materials suitable for that purpose, such as copper or copper alloys, aluminum alloys, iron silicon alloys, and stainless steel, such as 18% Cr–8% Ni variety, for example. Parts that are subjected to heat will also be constructed of suitable heat-resisting materials.

Although we have shown and described certain specific embodiments of our invention we are fully aware that a number of modifications thereof are possible. Hence, our invention, is not to be restricted except in so far as is necessitated by the prior art and by the spirit of the appended claims.

What we claim as our invention and desire to be secured by Letters Patent of the United States is:

1. The process of operating a distillation unit for concentrating aqueous materials containing at least one lower aliphatic acid including azeotropic distillation with an ester-alcohol withdrawing agent, which comprises charging the unit with a predetermined amount of withdrawing agent insufficient, at a predetermined rate of feed of the acidic aqueous solution to the unit, to reduce the acid content of the off water from the unit to less than 1%, supplying said aqueous materials to the unit, subjecting the materials in the unit to a distillation treatment, withdrawing materials containing off water from the upper part of the unit, determining the acid content of the off water, and making several further additions of withdrawing agent, totalling several hundred pounds of agent to the distillation unit to cause a reduction in the acid content of the off water thereafter separated, to less than 1%.

2. The process of balancing a distillation unit for concentrating aqueous solutions containing at least one lower aliphatic acid including azeotropic distillation with an ester-alcohol withdrawing agent, which comprises charging the unit with a predetermined amount of said ester-alcohol withdrawing agent, substantially insufficient, at a predetermined rate of feed of the acidic-aqueous solution, to prevent loss of acid in the water from the distillation unit, supplying said aqueous solution to the unit in a vaporous condition, subjecting the materials in the unit to a distillation treatment involving at least the phases of rectification, of the acid from water at and below the point of feed to the unit, and the fractionation of withdrawing agent-water azeotrope from very weak acid in the upper portion of the unit, withdrawing vaporized materials from the upper part of the unit, separating a water component from these vaporized materials, determining the acid content of the water component separated, and incorporating a further quantity of ester-alcohol in the distillation unit sufficient to cause a reduction in the acid content of the water component thereafter separated, but insufficient to show a withdrawing agent content in the concentrated acid being produced.

3. A process for starting a distillation unit for dehydrating aqueous solutions containing acetic acid, including azeotropic distillation with a withdrawing agent essentially comprised of the two components ester and alcohol, which comprises charging the unit with a predeterminel amount of withdrawing agent insufficient to reduce the acid content of the off water from the distillation to less than 1%, supplying to the system with aqueous materials containing at least one lower aliphatic acid, subjecting the materials in the system to a distillation treatment, rectifying aqueous acid in the absence of withdrawing agent at least in a portion of the system, withdrawing vaporized materials, comprising at least the three components ester, alcohol and water, from the unit, separating off water from these vaporized materials, observing the acid content of the watery materials separated, and adding further quantities of withdrawing agent to the distillation unit sufficient to cause a reduction in the acid content of the off water to less than 1%.

4. A process for starting and balancing a unit for dehydrating aqueous solutions containing at least one lower aliphatic acid including distillation with a withdrawing agent, which comprises charging the unit with a predetermined amount of withdrawing agent comprised of at least the two components ester and alcohol, insufficient at a predetermined rate of feed of the acidic aqueous solution to the unit to remove all of the water from the acidic aqueous solution as a constant boiling composition, supplying the acidic aqueous solution to the distillation unit, rectifying acid and water in the lower part of the unit without entrainer, withdrawing vaporized materials comprised of ester, alcohol and water from the unit, condensing these vaporized materials, separating water therefrom and determining the acid content of the water, and incorporating further quantities of agent in the unit sufficient to cause a several per cent reduction in the acid content of said water to finally reduce the acid content of the water thereafter separated to less than one-tenth of a per cent.

5. A process for starting and balancing a distillation unit for dehydrating aqueous solutions containing at least one lower aliphatic acid including azeotropic distillation with an entrainer comprised of two components comprising ester and alcohol, which comprises incorporating in the unit a predetermined amount of the two component entrainer inifficient, at a predetermined rate of feed of the acidic aqueous solution to the unit, to remove all of the water from the acidic aqueous solution as an azeotrope composition, supplying the acidic aqueous solution to the distillation unit, subjecting the materials in the unit to a distillation treatment, rectifying acid and water in the lower portion of the unit without entrainer, withdrawing vaporized materials comprised of at least the two entrainer components and water, from the upper part of the unit, condensing a plurality of these vaporized materials and determining the acid content of water separated therefrom, and incorporating several hundred pounds of additional entrainer in the distillation unit sufficient to cause a reduction in the acid content of the water thereafter separating to less than 1%, but insufficient to show an entrainer content in the dehydrated acid being produced.

ARTHUR W. BRIGHT.
JOHN H. ZEIGLER.